(12) United States Patent
Fors et al.

(10) Patent No.: US 6,931,249 B2
(45) Date of Patent: *Aug. 16, 2005

(54) METHOD AND APPARATUS FOR A TARGET-INITIATED HANDOFF FROM A SOURCE CELLULAR WIRELESS NETWORK TO A TARGET NON-CELLULAR WIRELESS NETWORK

(75) Inventors: Chad M. Fors, Algonquin, IL (US); Raymond M. Liss, St. Charles, IL (US); Rajesh S. Pazhyannur, Lake Zurich, IL (US); Venkat Gopikanth, Buffalo Grove, IL (US)

(73) Assignee: Motorola, Inc., Schaumburg, IL (US)

( * ) Notice: Subject to any disclaimer, the term of this patent is extended or adjusted under 35 U.S.C. 154(b) by 182 days.

This patent is subject to a terminal disclaimer.

(21) Appl. No.: 10/349,667

(22) Filed: Jan. 23, 2003

(65) Prior Publication Data

US 2004/0203788 A1 Oct. 14, 2004

(51) Int. Cl.[7] .............................. H04Q 7/20; H04Q 7/00
(52) U.S. Cl. ...................... 455/436; 455/442; 455/439; 455/433; 455/437; 455/432.1; 370/331; 370/328; 370/395.52
(58) Field of Search ................................ 455/436, 442, 455/439, 433, 437, 432.1; 370/331, 328, 395.52

(56) References Cited

U.S. PATENT DOCUMENTS

| | | | |
|---|---|---|---|
| 5,175,867 A | | 12/1992 | Wejke et al. |
| 5,796,727 A | * | 8/1998 | Harrison et al. ............ 370/338 |
| 6,604,139 B1 | * | 8/2003 | Sajina et al. ................ 709/224 |
| 2002/0085719 A1 | * | 7/2002 | Crosbie ...................... 380/248 |
| 2002/0147008 A1 | * | 10/2002 | Kallio ........................ 455/426 |
| 2003/0081571 A1 | * | 5/2003 | Hur ............................. 370/331 |
| 2003/0114158 A1 | * | 6/2003 | Soderbacka et al. ........ 455/436 |
| 2003/0134650 A1 | * | 7/2003 | Sundar et al. .............. 455/465 |
| 2003/0174667 A1 | * | 9/2003 | Krishnamurthi et al. .... 370/328 |
| 2004/0008645 A1 | * | 1/2004 | Janevski et al. ............ 370/331 |
| 2004/0072593 A1 | * | 4/2004 | Robbins et al. ............. 455/560 |
| 2004/0081120 A1 | * | 4/2004 | Chaskar ..................... 370/328 |

* cited by examiner

*Primary Examiner*—Sonny Trinh
*Assistant Examiner*—Huy Phan
(74) *Attorney, Agent, or Firm*—Jeffrey K. Jacobs

(57) ABSTRACT

To address the need for an apparatus and method for handoff from a cellular wireless network to a non-cellular wireless network (WLAN, e.g.), the present application describes an access gateway (214) and a dual mode mobile station (201) that enable such handoffs. The MS provides information to the access gateway so that it can initiate a handoff with the serving cellular MSC (251). By triggering handoffs in this manner, cellular networks need not have special information about non-cellular networks to support handoffs. Instead, dual mode MSs can determine when a handoff to a non-cellular network is preferred and request a handin (302) from the non-cellular network.

37 Claims, 3 Drawing Sheets

METHOD AND APPARATUS FOR A TARGET-INITIATED HANDOFF FROM A SOURCE CELLULAR WIRELESS NETWORK TO A TARGET NON-CELLULAR WIRELESS NETWORK

CROSS-REFERENCE TO RELATED APPLICATIONS

This application is related to a co-pending application entitled "METHOD AND APPARATUS FOR A SOURCE-INITIATED HANDOFF FROM A SOURCE CELLULAR WIRELESS NETWORK TO A TARGET NON-CELLULAR WIRELESS NETWORK", filed on even date herewith, and assigned to the assignee of the instant application.

FIELD OF THE INVENTION

The present invention relates generally to wireless communication systems and, in particular, to handoff from a source cellular wireless network to a target non-cellular wireless network.

BACKGROUND OF THE INVENTION

With the growing popularity of non-cellular wireless networks, such as wireless local area networks (WLANs), a demand for integration with overlaid or adjacent cellular networks has arisen in the marketplace. A solution for the integration of WLAN and cellular networks must include the ability to perform seamless handovers at least for voice services. Current cellular systems (e.g., GSM and CDMA) allow for such mobility between cell sites, but technology does not currently exist to allow calls to be maintained across a cellular-to-WLAN border. Without this capability, a voice call would be dropped at the border of the two systems, or in an overlay situation, the call may continue but not under the control of the optimal or preferred system for that location. Therefore, a need exists for an apparatus and method for handoff from a cellular wireless network to a non-cellular wireless network.

An overview of some handoff prior art will support the novelty of the invention described below. Handoffs across different wireless technologies have been accomplished before, for example, between CDMA and analog cellular. CDMA to analog handoff based on DAHO (Database Assisted Handoff) is a specific example. DAHO initiates a handoff from CDMA to analog based on the existence of pilot signals and location information stored in the source cellular system. However, this is not a viable solution for a CDMA-WLAN system because the number of WLAN APs are much larger than analog base stations, thus requiring very large databases to be stored in each CDMA base site. Consequently, this approach would be cumbersome and complex.

Similar to CDMA-analog handoffs, UMTS-GSM handoffs are known. These handoffs are enabled by incorporating changes in the GSM and UMTS base sites to recognize each other's cell sites. This is done by modifying the existing list of neighboring cells to include cells of the other technology. Specific changes to handover signaling between the MS and the BS is also required to enable the handover. The invention described below does not involve any changes to the neighbor lists or introduce any new handover signaling between the MS and the cellular BS.

Inter-MSC (mobile switching center) handoffs are defined in CDMA IS-95 B and GSM systems to provide handoffs between two base sites that are controlled by distinct MSCs. The Inter-MSC handoff procedures as defined in all cellular networks are initiated by the source MSC (the MSC currently serving the serving base site). The current IS-41 and MAP procedures (the interfaces governing the handoff procedure in CDMA and GSM respectively) only provide for source initiated handoffs. This can be seen, for example, in FIG. 1. FIG. 1 illustrates the inter-MSC handoff procedure for IS-95 systems based on the IS-41 specifications. (MAP procedures for GSM are similar.)

The known handoff procedure begins with the mobile station (MS) generating a CDMA Pilot Strength Measurement Message (PSMM) 1. The PSMM message contains the PN (pseudo noise) offsets and signal strengths (Ec/Io) of pilots in the MS'S candidate and active set. The base site (BS) determines that the PN offset sent in the PSMM does not correspond to a cell under its control. The BS generates a Handoff Required message 2 containing the Cell identifier List (with Cell ID, and optionally more information like MSC ID, LAC, etc). The source MSC then identifies the target BS and the associated MSC. It sets up a terrestrial circuit to the target MSC, and sends an IS41_FACDIR2 (IS41FacilitisDirective2INVOKE) message 3. The message contaris the inter-MSC circuit ID, target cell ID. and other handoff-related parameters like channel condition, etc. The target MSC then initiates a Handoff Request 4 to the appropriate target BS. The message contains parameters that are mostly obtained (directly transferred) from the FACDIR2 message 3.

A Handoff Request Ack 5 is sent by the target BS to the MSC after radio resources and terrestrial circuits are allocated, and an IS_41_facdir2 6 is sent to the source MSC containing the parameters obtained from the Handoff Request Ack message. The Handoff Command 7 is then sent to the source BS to begin the handoff procedure, and the information in this message is used to generate an IS95_ Extended Handoff Direction Message 8, containing the new frequency channel and frame offset. The IS95_Handoff Direction Message instructs the MS to switchover to the target cell/BS and start sending preamble frames on the reverse channel. The MS acks this message by sending an IS95_Extended Handoff Direction Ack Message 9 to the source BS. The source BS then sends a Handoff Commenced message 10 to the source MSC indicating that the handoff is in progress.

When ready, the MS sends and IS_95 Handoff Completion message 11 to the target BS. The target BS then sends a Handoff Complete message 12 to the target MSC, and the target MSC informs the source MSC of the successful handover with an MSONCH message 13. Finally, a Clear Command message 14 and a Clear Complete message 15 are exchanged in order to release resources between the source BS and the source MSC.

Two aspects of this prior art handoff messaging are particularly pertinent. First, it is the MS that identifies the handoff target to the source BS and MSC by providing the PN offset of the target. Second, it is the source MSC that initiates the handoff messaging (see FIG. 1, message 3) by translating the PN offset to a target BS/MSC. However, if the target system were a WLAN system, the handoff target would be a WLAN access point (AP), and presently there is no messaging to enable either the MS or the source MSC to identify this target WLAN AP.

DETAILED DESCRIPTION OF EMBODIMENTS

To address the need for an apparatus and method for handoff from a cellular wireless network to a non-cellular wireless network (WLAN, e.g.), the present application describes an access gateway and a dual mode mobile station that enable such handoffs. When the dual mode is being served by a cellular BS, it continues to monitor WLAN availability. Based on conditions like the relative signal strength of cellular and WLAN, the MS may request a handin to the WLAN. Specifically, the MS provides information to the access gateway so that it can initiate a handoff with the serving cellular MSC. By triggering handoffs in this manner, cellular networks need not have special information about non-cellular networks to support handoffs. Instead, dual mode MSs can determine when a handoff to a non-cellular network is preferred and request a handin from the non-cellular network.

Figure 1:
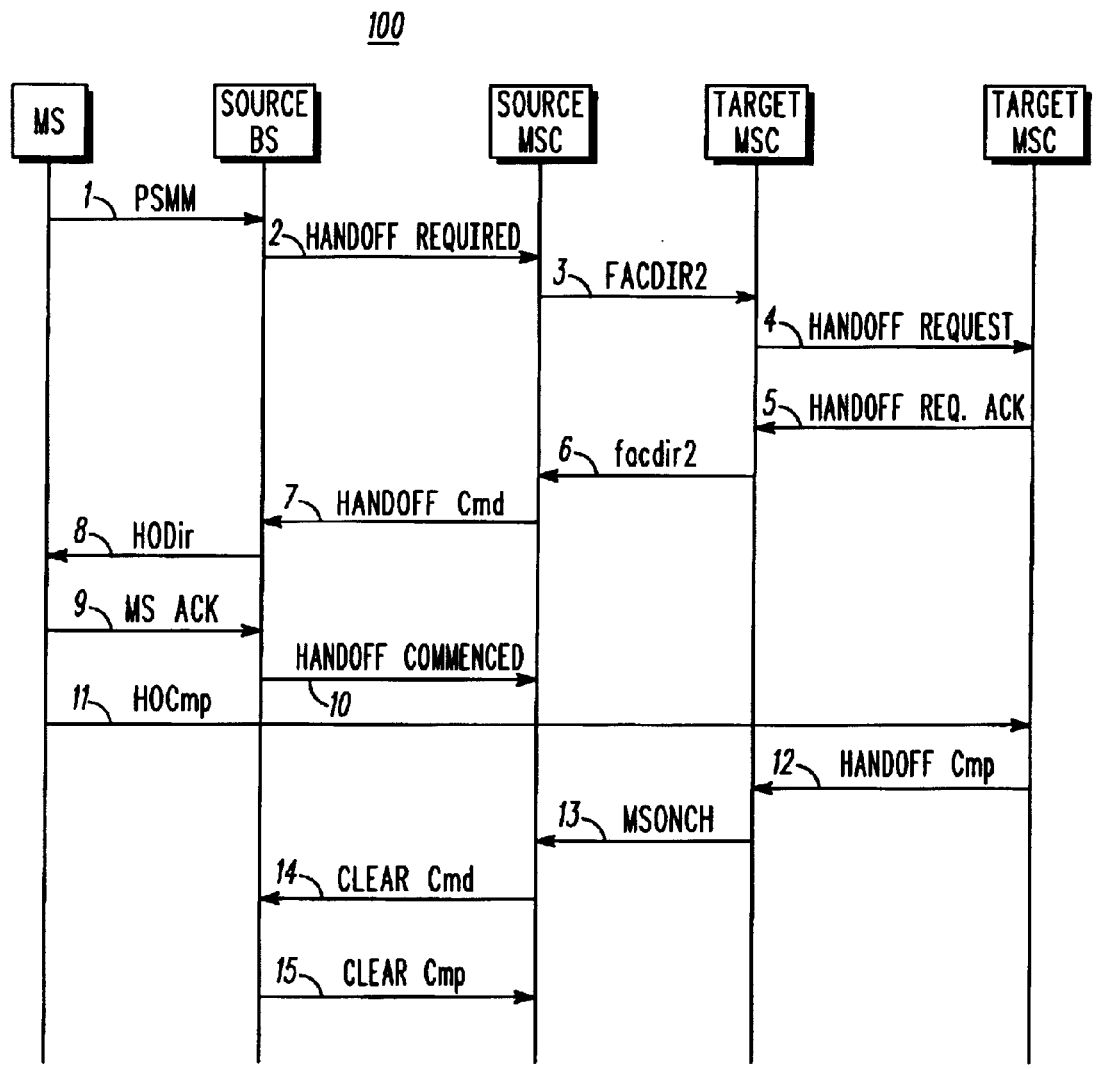
FIG. 1 is a message flow diagram of prior art messaging exchanged by system components to affect a handoff.
Figure 2A:
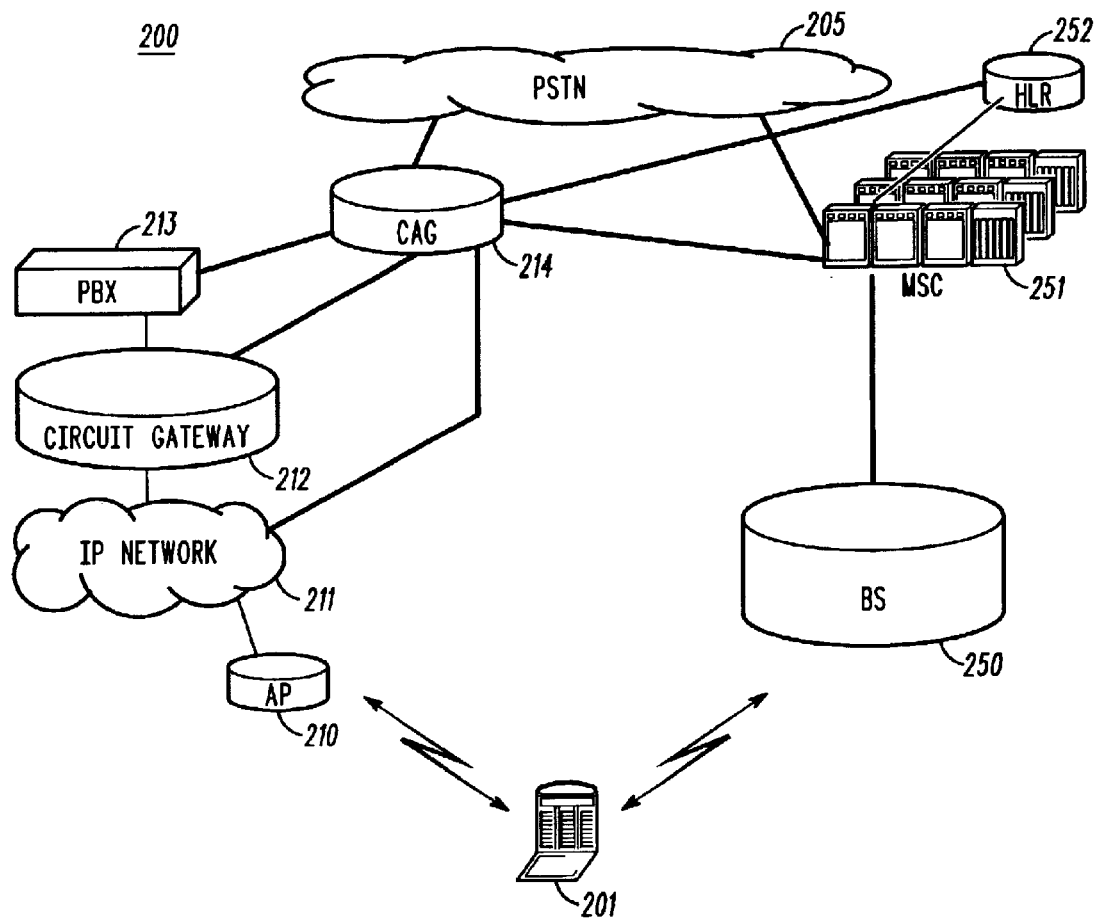
FIG. 2a is a block diagram depiction of a communication system in accordance with an embodiment of the present invention.
Figure 2B:
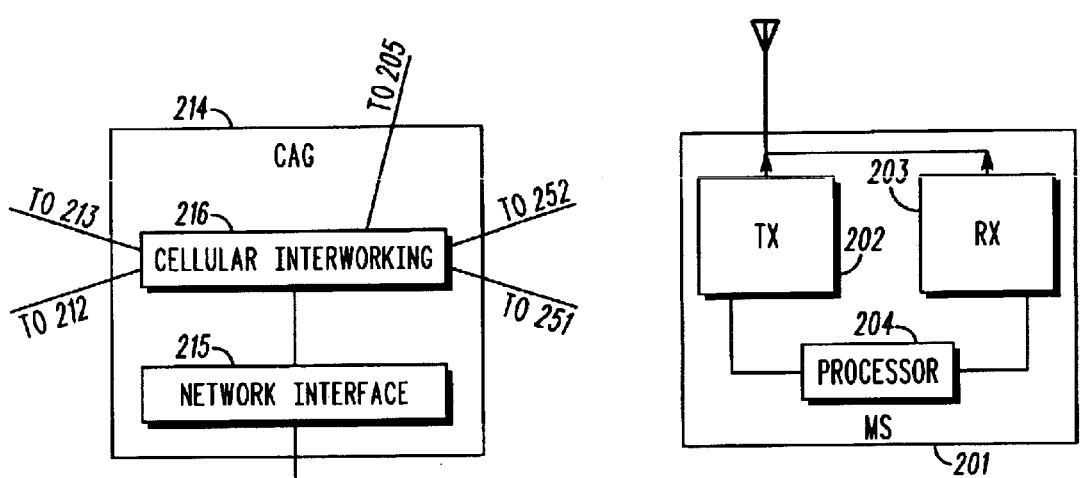
FIG. 2b is a block diagram depiction of communication system components in accordance with an embodiment of the present invention.
Figure 3:
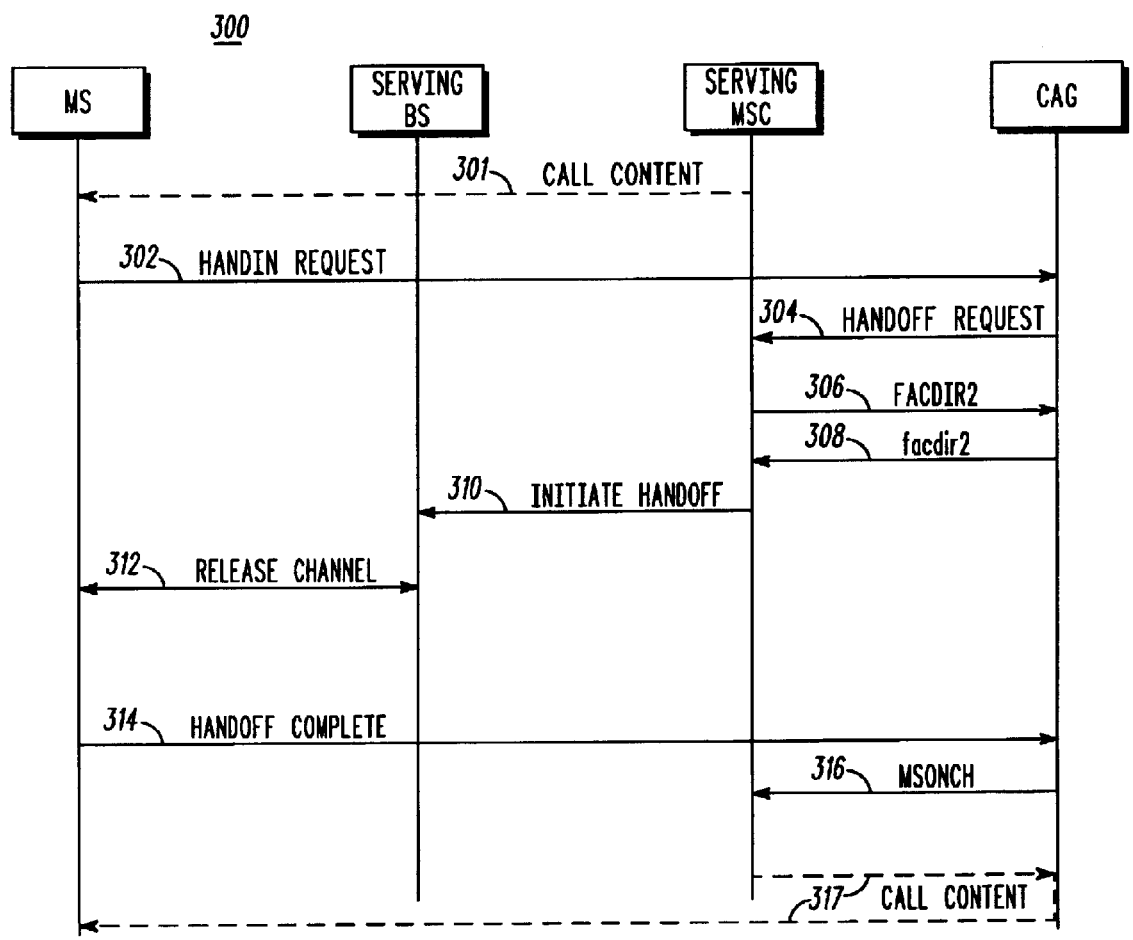
FIG. 3 is a messaging flow diagram of messaging and information exchanged by system components to affect a handoff in accordance with an embodiment of the present invention.

The disclosed embodiments can be more fully understood with reference to FIGS. 2a, 2b, and 3. FIG. 2a is a block diagram depiction of communication system 200 in accordance with an embodiment of the present invention. Communication system 200 comprises a known wireless local area network (WLAN), a known cellular network, and components to interface them together, the combination suitably modified to implement the present invention. The WLAN is a known wireless infrastructure such as that conforming to the IEEE 802.11 standard. The cellular network is a well-known Code Division Multiple Access (CDMA) network, based on the Telecommunications Industry Association/Electronic Industries Association (TIA/EIA) standard IS-95. (The TIA/EIA can be contacted at 2001 Pennsylvania Ave. NW, Wash. D.C. 20006). In various alternative embodiments, communication system 200 may utilize other cellular communication protocols such as, but not limited to, GSM, UMTS, IS-2000, and "IDEN."

The cellular network of communication system 200 includes known radio access network (RAN) entities, such as base site (BS) 250 (comprising a base site controller and one or more base transceiver stations), mobile location register (HLR) 252. Communication system 200 further includes WLAN access point (AP) 210, internet protocol (IP) network 211, circuit gateway 212, private branch exchange (PBX) 213, and cellular access gateway (CAG) 214. Both the WLAN and cellular network of system 200 support voice services. The WLAN supports voice over a pico-cellular environment, while the cellular network supports voice over the macro-cellular environment. As integrated into system 200, these networks further support voice-session mobility from the cellular network to the WLAN.

Communication system 200 also includes mobile stations (MSs), such as MS 201. MS 201 is a dual-mode phone capable of communicating with both the cellular network (e.g., BS 250) and the WLAN (e.g., AP 210). FIG. 2b depicts MS 201 is greater detail. MS 201 comprises well-known entities such as processor 204, dual-mode transmitter 202, and dual-mode receiver 203. Transmitters, receivers, and processors as used in MSs are all well known in the art. This common set of MS components is adapted using known telecommunications design and development techniques to implement the wireless unit aspect of the present invention. Processors typically comprise components such as microprocessors, digital signal processors, memory, and/or logic circuitry designed to implement algorithms that have been expressed as computer instructions and/or in circuitry. Given an algorithm or a logic flow, those skilled in the art are aware of the many design and development techniques available to implement a processor that performs the given logic.

FIG. 2b also depicts CAG 214 in greater detail. CAG 214 comprises a known network interface 215 and cellular interworking device 216. Network interface 215 provides an access gateway interface to IP network 211, while cellular interworking device 216 performs cellular mobility interworking (e.g., interworking for registration, authentication, and handoff) by interfacing with MSC 251, HLR 252, PBX 213, and circuit gateway 212. Cellular interworking device 216 also performs PSTN interworking by interfacing with PSTN 205 using landline signaling protocols such as ISDN User Part (ISUP) and/or Multi Frequency R1 (MFR1). Generally, cellular and PSTN interworking components are known in the art. These components in addition to network interface components are combined and adapted using known telecommunications design and development techniques to implement the access gateway aspect of the present invention. Given a protocol or a message flow, those skilled in the art are aware of the many design and development techniques available to implement a networking platform that performs the specified function.

Furthermore, those skilled in the art will recognize that FIGS. 2a and 2b do not depict all of the network equipment and devices necessary for system 200 to operate fully but only those system blocks and logical entities particularly relevant to the description of embodiments of the present invention. Those skilled in the art are aware of the many ways the necessary devices and entities can be implemented and/or purchased from wireless networking companies and wireless communications companies such as "MOTOROLA."

High-level operation of a first embodiment of the present invention occurs substantially as follows. In the first embodiment, MS 201's dual mode functionality allows it to support voice services over the cellular network and the WLAN. Thus, MS 201 supports a standard cellular voice call model such as one specified by the GSM, CDMA, or "IDEN" technologies, for example. For the WLAN domain, MS 201 supports a voice over IP (VoIP) protocol, such as H.323, Session Initiation Protocol (SIP), or the Skinny Protocol of "CISCO." The VoIP protocols are used between MS 201 and circuit gateway 212. Circuit gateway 212, when connected to PBX 213, provides the interworking necessary for the desired PBX feature transparency to MS 201. Also, for signaling with WLAN AP 210, MS 201 supports IEEE 802.11 signaling in the first embodiment, but signaling types such as Bluetooth or HiperLAN 2 may additionally or alternatively be supported in other embodiments. Lastly, the dual mode capability of MS 201 allows it to measure the signal strength of the WLAN AP(s), such as AP 210, as well as the cellular BTS(s), such as those of BS 250.

Generally, in the first embodiment, CAG 214 interworks the voice call model and mobility management within the WLAN domain with the voice call model and mobility schemes of the standard macro-cellular domain. It provides the required interworking between the WLAN and cellular domain in the areas of cellular registration, authentication, and cross-technology handovers. In addition, it also interworks the cellular network with the existing voice infrastructure (i.e., PBX 213 and circuit gateway 212) in the WLAN domain.

In the first embodiment, cellular interworking device 216 provides the appearance to a GSM/"IDEN" (MAP) or a CDMA (IS-41) cellular network that the WLAN domain is another standard cellular network. Cellular interworking device 216 enforces message discrimination by sending/receiving MAP/IS-41 messaging to/from an MSC/HLR. Cellular interworking device 216 effectively emulates either an MSC or a VLR role to the far-end macro-cellular domain.

In the first embodiment, cellular interworking device 216 also keeps subscriber profile, supports authentication, supports registration, etc. At a minimum, cellular interworking device 216 emulates a portion of the cellular VLR. It provides higher-layer mobility support to allow CAG 214 to act like a standard MSC to the macro-cellular MSC/HLR domain.

In addition, in the first embodiment, cellular interworking device 216 provides service logic similar to call processing, but not a complete set. The distinction typically is between service/feature "control" and service/feature "execution." There are only a few scenarios (e.g. handoff from cellular to WLAN) where cellular interworking device 216 provides full call processing, allowing the connection to be made. (i.e., control) and setting up the bearer connection through CAG 214 (i.e., basic execution). Since CAG 214 is only involved in inter-domain session establishment and handoffs, these scenarios require functionality to maintain the basic state of the subscriber's session. In most other scenarios, like a PSTN to WLAN session establishment, PBX 213 provides all call processing.

In the first embodiment, the general role of PBX 213 is to terminate circuit voice calls and provide call processing with access to voice features as if MS 201 were a typical wired telephone in the enterprise domain. In addition, the general purpose of circuit gateway 212 is to interwork the voice call models in the WLAN-IP domain and the typical circuit (i.e., PBX) domain. This requires both bearer and control interworking. The voice bearer and signaling from dual mode MS 201 and WLAN APs connect over IP and may use IP telephony call model conventions. Since the IP telephony conventions do not work with the typical wired PBX, circuit gateway 212 provides this important interworking to PBX 213.

Messaging-focused operation of the first embodiment of the present invention occurs substantially as follows. FIG. 3 is a messaging flow diagram 300 of messaging and information exchanged by system components to affect a handoff from a cellular wireless network to a non-cellular wireless network (e.g., a WLAN) in accordance with the first embodiment of the present invention. Already involved in a call, MS 201 receives call information (301) via serving BS 250 and associated (i.e., serving) MSC 251. This call information refers to real-time call content such as voice or video-telephony.

As MS 201 moves Within the coverage area of WLAN AP 210, MS 201 performs signal strength measurements and establishes contact with AP 210. Establishing contact typically involves obtaining an IP address for itself (MS 201) and for an access gateway (CAG 214, in the first embodiment). At some point, MS 201 determines that a handoff from serving BS 250 to AP 210 is preferred. MS 201 may determine this based on criteria such as the relative signal strength of BS 250 and AP 210, the relative cost of wireless service, and/or user indications of preference. For example, the user may set an MS option to switch to WLAN service whenever signal conditions allow or whenever the WLAN service is determine to be cheaper.

Having determined that a handoff is preferred, processor 204 sends a handin request (302) to CAG 214. The request is sent to CAG 214 via transmitter 202, WLAN AP 210, and IP network 211. Thus, the handin request is sent using an IP packet addressed to CAG 214. The handin request contains an indication of which MSC is associated with MS 201, i.e., which MSC is serving MS 201. The indication takes the form of a serving cell identifier which CAG 214 can use to determine the corresponding serving MSC. In the first embodiment, this serving cell identifier is the PN offset of MS 201's serving cell within BS 250, while in an alternative GSM embodiment, the serving cell identifier may be the Base Transceiver Station Identity Code (BSIC) of MS 201's serving cell.

Cellular interworking device 216 of CAG 214 receives the IP-packetized handin request from MS 201 via network interface 215. In response to MS 201's handin request, cellular interworking device 216 of CAG 214 sends a handoff request (304) to MSC 251. CAG 214, representing the handoff target, sends this message to trigger inter-MSC handoff procedures. Thus, it is the handoff target that initiates the handoff of MS 201 from the cellular network to the WLAN. This new handoff request message is necessary because the prior art messaging (i.e., IS-41/MAP) does not provide for the handoff target to initiate an inter-MSC handoff. In the prior art, the serving MSC initiates such handoffs; however, in the case of a cellular-to-WLAN handoff, the serving cellular MSC (MSC 251, e.g.) is not aware of the non-cellular, WLAN network.

The handoff request message triggers serving MSC 251 to set up the necessary circuits and send a FACDIR2 message. CAG 214 receives the MAP FACDIR2 message (306) from serving MSC 251 and sends a MAP facdir2 message (308) back in response. Serving MSC 251 then sends an initiate handoff message (310) to serving BS 250. In the first embodiment, this initiate handoff message would be a Clear Command signaling serving BS 250 to clear its wireless resources supporting MS 201. Release channel messaging particular to the cellular network (e.g., IS-95 or GSM messaging) is then exchanged (312) between MS 201 and BS 250. For example, processor 204 of MS 201 receives a handoff release indication from BS 250 via receiver 203. In the first embodiment, this indication would be a CDMA Handoff Direction Message, while in an alternative GSM embodiment this indication may be a HND_CMD (handoff command) message.

After completing channel release messaging, processor 204 of MS 201 sends a handoff complete indication (314) to CAG 214 via transmitter 202, WLAN AP 210, and IP network 211. Thus, the handoff complete indication is sent using an IP packet addressed to CAG 214. Cellular interworking device 216 of CAG 214 receives the IP-packetized handoff complete indication from MS 201 via network interface 215. In response to this indication, cellular interworking device 216 sends an indication to MSC 251 that the MS is on channel (316). Specifically, this indication is a MAP MSONCH message.

MSC 251 then switches the MS 201 call information to GAG 214.CAG 214 receives the call information (via Digital Service 0 (DS0) signaling on a T1, e. g.) and routes (317) it to MS 201 via IP network 211 and WLAN AP 210. Thus, MS 201 completes a handoff from the cellular network to the WLAN, continuing to receive its call information via MSC 251, CAG 214, and WLAN AP 210.

In the foregoing specification, the present invention has been described with reference to specific embodiments. However, one of ordinary skill in the art will appreciate that various modifications and changes may be made without departing from the spirit and scope of the present invention as set forth in the appended claims. Accordingly, the specification and drawings are to be regarded in an illustrative rather than a restrictive sense, and all such modifications are intended to be included within the scope of the present invention. In addition, those of ordinary skill in the art will appreciate that the elements in the drawings are illustrated for simplicity and clarity, and have not necessarily been drawn to scale. For example, the dimensions of some of the elements in the drawings may be exaggerated relative to other elements to help improve an understanding of the various embodiments of the present invention.

Benefits, other advantages, and solutions to problems have been described above with regard to specific embodiments of the present invention. However, the benefits, advantages, solutions to problems, and any element(s) that may cause or result in such benefits, advantages, or solutions, or cause such benefits, advantages, or solutions to become more pronounced are not to be construed as a critical, required, or essential feature or element of any or all the claims. As used herein and in the appended claims, the term "comprises," "comprising," or any other variation thereof is intended to refer to a non-exclusive inclusion, such that a process, method, article of manufacture, or apparatus that comprises a list of elements does not include only those elements in the list, but may include other elements not expressly listed or inherent to such process, method, article of manufacture, or apparatus.

The terms a or an, as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly, and not necessarily mechanically. The term program, as used herein, is defined as a sequence of instructions designed for execution on a computer system. A program, or computer program, may include a subroutine, a function, a procedure, an object method, an object implementation, an executable application, an applet, a servlet, a source code, an object code, a shared library/dynamic load library and/or other sequence of instructions designed for execution on a computer system.

What is claimed is:

1. An access gateway able to facilitate handoff from a cellular wireless network to a non-cellular wireless network, the access gateway comprising:
   a network interface; and
   a cellular interworking device, communicatively coupled to the network interface,
   adapted to receive a handin request from a mobile station (MS) via a non-cellular access point and the network interface,
   adapted to send a handoff request to a mobile switching center (MSC) associated with the MS,
   adapted to receive a handoff complete indication from the MS via the non-cellular access point and the network interface, and
   adapted to send an indication to the MSC that the MS is on channel, in response to the handoff complete indication.

2. The access gateway of claim 1, wherein the non-cellular access point comprises a wireless local area network (WLAN) access point.

3. The access gateway of claim 2, wherein the WLAN access point utilizes wireless signaling of at least one type from the group of signaling types consisting of Bluetooth, HiperLAN 2, and IEEE 802.11.

4. The access gateway of claim 1, wherein the network interface is adapted to send and receive messaging using an internet protocol.

5. The access gateway of claim 1, wherein the cellular interworking device is adapted to perform cellular mobility interworking by interfacing with MSCs and home location registers (HLRs).

6. The access gateway of claim 5, wherein the cellular interworking device is adapted to perform cellular interworking for registration, authentication, and handoff.

7. The access gateway of claim 5, wherein the cellular interworking device is adapted to perform PSTN interworking utilizing at least one landline signaling protocol from the group consisting of ISDN User Part (ISUP) and Multi Frequency R1 (MFR1).

8. The access gateway of claim 5, wherein the cellular interworking device is adapted to perform cellular mobility interworking by interfacing with a circuit gateway.

9. The access gateway of claim 8, wherein the cellular interworking device is adapted to perform cellular mobility interworking by interfacing with a PBX.

10. A method for facilitating handoff of a mobile station (MS) from a cellular wireless network to a non-cellular wireless network comprising:
    receiving, by an access gateway, a handin request from the MS via a non-cellular access point;
    sending, by the access gateway, a handoff request to a mobile switching center (MSC) associated with the MS;
    receiving, by the access gateway, a handoff complete indication from the MS via the non-cellular access point; and
    sending, by the access gateway in response to the handoff complete indication, an indication to the MSC that the MS is on channel.

11. The method of claim 10, wherein receiving the handin request comprises receiving the handin request via an internet protocol (IP) packet.

12. The method of claim 10 further comprising:
    receiving, by the access gateway, call information for the MS from the MSC; and
    routing, by the access gateway, the call information to the MS via the non-cellular access point.

13. The method of claim 12, wherein the call information is received via Digital Service 0 (DS0) signaling.

14. The method of claim 12, wherein the call information is routed to the non-cellular access point via an Internet protocol (IP) network.

15. The method of claim 12, wherein the call information comprises information of at least one type from the group consisting of voice and video-telephony.

16. The method of claim 10, wherein sending the handoff request comprises determining that the MSC is a serving MSC for the MS.

17. The method of claim 16, wherein the handin request comprises an indication of which MSC is associated with the MS.

18. The method of claim 17, wherein the handin request comprises a serving cell identifier and wherein the access gateway associates the MSC with the serving cell identifier.

19. The method of claim 18, wherein the serving cell identifier comprises a Base Transceiver Station Identity Code (BSIC).

20. The method of claim 18, wherein the serving cell identifier comprises a PN offset.

21. The method of claim 10, further comprising:
receiving, by the access gateway, a mobile application part (MAP) FACDIR2 (FacilitiesDirective2 INVOKE) message in response to the handoff request; and
sending, by the access gateway, a MAP facdir2 message to the MSC associated with the MS in response to the MAP FACDIR2 message.

22. The method of claim 10, wherein sending the indication that the MS is on channel comprises sending a MAP MSONCH message.

23. The method of claim 10, wherein sending the indication that the MS is on channel comprises sending the indication to the MSC in response to the handoff complete indication from the MS.

24. A mobile station (MS) able to handoff from a cellular wireless network to a non-cellular wireless network, the MS comprising:
a transmitter;
a receiver; and
a processor, communicatively coupled to the transmitter and receiver,
adapted to send, via the transmitter, a handin request to an access gateway via a non-cellular access point,
adapted to receive, via the receiver, a handoff release indication from a serving cellular base site, and
adapted to send, via the transmitter and after receiving the handoff release indication, a handoff complete indication to the access gateway via the non-cellular access point.

25. A method for handing off from a cellular wireless network to a non-cellular wireless network comprising:
sending, by a mobile station (MS), a handin request to an access gateway via a non-cellular access point;
receiving, by the MS, a handoff release indication from a serving cellular base site; and
sending, by the MS after receiving the handoff release indication, a handoff complete indication to the access gateway via the non-cellular access point.

26. The method of claim 25, further comprising:
receiving, by the MS, call information via the serving cellular base site and a mobile switching center (MSC) associated with the MS; and
receiving, by the MS, call information via the non-cellular access point, the access gateway, and the MSC.

27. The method of claim 26, wherein receiving call information via the non-cellular access point occurs after sending the handoff complete indication.

28. The method of claim 26, wherein receiving call information via the non-cellular access point further comprises receiving call information via a voice-over-IP (VoIP) protocol.

29. The method of claim 28, wherein the VoIP protocol comprises a protocol from the group consisting of a H.323 protocol, a Session Initiation Protocol (SIP), and a Skinny Protocol.

30. The method of claim 25, further comprising obtaining, by the MS, an IP address for the MS.

31. The method of claim 25, further comprising obtaining, by the MS, an IP address for the access gateway.

32. The method of claim 25, further comprising determining, by the MS, that a handoff from the serving cellular base site to the non-cellular access point is preferred.

33. The method of claim 32, wherein determining that a handoff from the serving cellular base site to the non-cellular access point is preferred comprises determining that a handoff is preferred based on at least one handoff factor from the group consisting at relative signal conditions between cellular and non-cellular networks and relative cost of cellular and non-cellular service.

34. The method of claim 25, wherein sending the handin request comprises sending the handin request via an Internet protocol (IP) packet.

35. The method of claim 25, wherein sending the handoff complete indication comprises sending the handoff complete indication via an Internet protocol (IP) packet.

36. The method of claim 25, wherein the handoff release indication comprises a HND_CMD (handoff command) message from the serving cellular base site.

37. The method of claim 25, wherein the handoff release indication comprises a CDMA Handoff Direction Message from the serving cellular base site.

* * * * *